United States Patent
Park et al.

(10) Patent No.: US 9,257,230 B2
(45) Date of Patent: Feb. 9, 2016

(54) MULTILAYER CERAMIC CAPACITOR AND BOARD HAVING THE SAME MOUNTED THEREON

(71) Applicant: SAMSUNG ELECTRO-MECHANICS CO., LTD., Suwon-Si, Gyeonggi-Do (KR)

(72) Inventors: Min Cheol Park, Suwon-Si (KR); Sang Soo Park, Suwon-Si (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 127 days.

(21) Appl. No.: 14/243,884

(22) Filed: Apr. 2, 2014

(65) Prior Publication Data

US 2015/0131195 A1  May 14, 2015

(30) Foreign Application Priority Data

Nov. 8, 2013  (KR) .................. 10-2013-0135261

(51) Int. Cl.
*H01G 4/30* (2006.01)
*H01G 2/14* (2006.01)
*H01G 4/40* (2006.01)
*H01G 2/06* (2006.01)
(Continued)

(52) U.S. Cl.
CPC ............... *H01G 2/14* (2013.01); *H01G 2/065* (2013.01); *H01G 4/30* (2013.01); *H01G 4/40* (2013.01); *H01G 4/228* (2013.01); *H01G 4/232* (2013.01)

(58) Field of Classification Search
CPC ......... H01G 4/30; H01G 4/232; H01G 4/012; H01G 4/005; H01G 2/14; H01G 4/228; H01G 4/2325
See application file for complete search history.

(56) References Cited

U.S. PATENT DOCUMENTS

2008/0158773 A1   7/2008  Lee et al.
2008/0310077 A1*  12/2008  Itamura .................. H01G 4/228
                                                        361/306.3

(Continued)

FOREIGN PATENT DOCUMENTS

JP       2012-138415 A    7/2012
JP       2012-256641 A    12/2012
KR   10-2002-0074124 A    9/2002

(Continued)

OTHER PUBLICATIONS

Korean Notice of Office Action issued in counterpart Korean Application No. 10-2013-0135261 on Dec. 12, 2014; 6 pages.

*Primary Examiner* — Dion R Ferguson
(74) *Attorney, Agent, or Firm* — McDermott Will & Emery LLP

(57) ABSTRACT

A multilayer ceramic capacitor may include: a ceramic body including a plurality of dielectric layers and having first and second main surfaces, first and second side surfaces, and first and second end surfaces; a capacitor part formed in the ceramic body and including first and second internal electrodes, the first internal electrode having a first lead exposed to the second main surface and the second internal electrode having a second lead exposed to the first main surface; resistor parts including first and second internal connection conductors formed on the same dielectric layers among the plurality of dielectric layers in the ceramic body; and first to fourth external electrodes, first and third connection terminals, and second and fourth connection terminals. The capacitor part and the resistor parts may be connected in series to one another.

16 Claims, 6 Drawing Sheets

(51) Int. Cl.
 *H01G 4/228* (2006.01)
 *H01G 4/232* (2006.01)

(56) References Cited

U.S. PATENT DOCUMENTS

2009/0015985 A1* 1/2009 Togashi ............... H01G 4/012
 361/306.3
2010/0095498 A1* 4/2010 Aoki .................... H01G 4/012
 29/25.42
2010/0149769 A1* 6/2010 Lee ....................... H01G 2/065
 361/768
2011/0056735 A1 3/2011 Lee et al.
2012/0162853 A1 6/2012 Togashi
2013/0050897 A1* 2/2013 Kim ......................... H01G 4/12
 361/321.2

FOREIGN PATENT DOCUMENTS

KR 10-0809239 B1 3/2008
KR 10-2011-0027321 3/2011

* cited by examiner

MULTILAYER CERAMIC CAPACITOR AND BOARD HAVING THE SAME MOUNTED THEREON

CROSS-REFERENCE TO RELATED APPLICATION

This application claims the benefit of Korean Patent Application No. 10-2013-0135261 filed on Nov. 8, 2013, with the Korean Intellectual Property Office, the disclosure of which is incorporated herein by reference.

BACKGROUND

The present disclosure relates to a multilayer ceramic capacitor and a board having the same mounted thereon.

A multilayer ceramic capacitor, which is one of multilayer chip electronic components, is a chip shaped condenser mounted on printed circuit boards of various electronic products such as a display device, for example, a liquid crystal display (LCD), a plasma display panel (PDP), or the like, a computer, a smart phone, a mobile phone, and the like, to serve to charge electricity or discharge electricity.

Since this multilayer ceramic capacitor (MLCC) has advantages such as a small size, high capacitance, easiness of mounting, or the like, the multilayer ceramic capacitor may be used as a component of various electronic devices.

The multilayer ceramic capacitor may have a structure in which a plurality of dielectric layers and internal electrodes having different polarities are alternately stacked while being interposed between the dielectric layers.

Particularly, in a power supply device for a central processing unit (CPU) of a computer, or the like, voltage noise may be generated due to a rapid change in load current during a process of supplying low voltage.

Therefore, a multilayer ceramic capacitor has been widely used in the power supply device as a decoupling capacitor for suppressing voltage noise described above.

The multilayer ceramic capacitor serving as a decoupling capacitor needs to have low equivalent series inductance (ESL) in accordance with an increase in an operational frequency thereof. In order to decrease this ESL, a great amount of research has been conducted.

Further, in order to more stably supply power, the multilayer ceramic capacitor serving as a decoupling capacitor needs to have controllable equivalent series resistance (ESR) characteristics.

In the case in which an ESR value of the multilayer ceramic capacitor is lower than a required level, an impedance peak generated in a parallel resonant frequency due to the ESL of the capacitor and plane capacitance of a micro processor package may increase, and impedance in a series resonant frequency of the capacitor may excessively decrease.

Therefore, in order to allow a user to implement flat impedance characteristics of a power distribution network, ESR characteristics of multilayer ceramic capacitor serving as a decoupling capacitor needs to be easily controlled.

With regard to the control of the ESR characteristics, a method of using a material having high electrical resistance in external and internal electrodes may be considered. The method of changing a material as described above may provide high ESR characteristics while maintaining a low ESL structure according to the related art.

However, in the case of using the material having high resistance in the external electrode, a localized heat spot causing a current crowding phenomenon may be generated due to pin holes. Further, in the case of using the material having high resistance in the internal electrode, in order to match the material with a ceramic material in accordance with an increase in capacitance, the material used for the internal electrode also needs to be continuously changed.

Therefore, since an existing method for controlling ESR has disadvantages as described above, research into a multilayer ceramic capacitor capable of controlling the ESR has been still required.

In addition, in accordance with the recent trend toward the rapid development of a mobile terminal such as a tablet personal computer (PC), an ultra book, or the like, a micro processor also has been miniaturized and highly integrated.

Therefore, an area of the printed circuit board has decreased, and in a similar manner, a mounting space of the decoupling capacitor has been limited, such that a multilayer ceramic capacitor capable of satisfying the limited mounting space has been still required.

SUMMARY

An embodiment of the present disclosure may provide a multilayer ceramic capacitor and a board having the same mounted thereon.

According to an embodiment of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part formed in the ceramic body and including first and second internal electrodes, the first internal electrode having a first lead exposed to the second main surface and the second internal electrode having a second lead exposed to the first main surface; resistor parts including first internal connection conductors exposed to the first and second main surfaces and the first end surface and second internal connection conductors exposed to the first and second main surfaces and the second end surface, the first and second internal connection conductors being formed on the same dielectric layers among the plurality of dielectric layers in the ceramic body; and first to fourth external electrodes formed on the first and second main surfaces of the ceramic body and electrically connected to the first and second internal electrodes and the first and second internal connection conductors, first and third connection terminals formed on the first end surface of the ceramic body and connected to the first internal connection conductors, and second and fourth connection terminals formed on the second end surface of the ceramic body and connected to the second internal connection conductors, wherein the capacitor part and the resistor parts are connected in series to one another.

The first lead of the first internal electrode may be connected to the third external electrode, and the second lead of the second internal electrode may be connected to the second external electrode.

One ends of the first internal connection conductors may be connected to the first internal electrode through the third external electrode, and the other ends thereof may be connected to the first external electrode.

One ends of the second internal connection conductors may be connected to the second internal electrode through the second external electrode, and the other ends thereof may be connected to the fourth external electrode.

One ends of the first and third connection terminals may be connected to the first external electrode, and the other ends thereof may be connected to the third external electrode.

One ends of the second and fourth connection terminals may be connected to the second external electrode, and the other ends thereof may be connected to the fourth external electrode.

According to another embodiment of the present disclosure, a multilayer ceramic capacitor may include: a ceramic body including a plurality of dielectric layers and having first and second main surfaces opposing each other, first and second side surfaces opposing each other, and first and second end surfaces opposing each other; a capacitor part formed in the ceramic body and including first and second internal electrodes, the first internal electrode having a third lead exposed to the second main surface and the second internal electrode having a fourth lead exposed to the first main surface; resistor parts including first internal connection conductors exposed to the first and second main surfaces and the first end surface and second internal connection conductors exposed to the first and second main surfaces and the second end surface, the first and second internal connection conductors being formed on the same dielectric layers among the plurality of dielectric layers in the ceramic body; first and second dummy electrodes formed in the ceramic body, the first dummy electrode being exposed to the first end surface of the ceramic body and the second dummy electrode being exposed to the second end surface of the ceramic body; and first to fourth external electrodes formed on the first and second main surfaces of the ceramic body and electrically connected to the first and second internal electrodes and the first and second internal connection conductors, first and third connection terminals formed on the first end surface of the ceramic body and connected to the first internal connection conductors, second and fourth connection terminals formed on the second end surface of the ceramic body and connected to the second internal connection conductors, and a fifth connection terminal formed on the first end surface of the ceramic body and connected to the first dummy electrode and a sixth connection terminal formed on the second end surface of the ceramic body and connected to the second dummy electrode, wherein the capacitor part and the resistor parts are connected in series to one another.

The third lead of the first internal electrode may be connected to the third external electrode, and the fourth lead of the second internal electrode may be connected to the second external electrode.

One ends of the first internal connection conductors may be connected to the first internal electrode through the third external electrode, and the other ends thereof may be connected to the first external electrode.

One ends of the second internal connection conductors may be connected to the second internal electrode through the second external electrode, and the other ends thereof may be connected to the fourth external electrode.

One ends of the first and third connection terminals may be connected to the first external electrode, and the other ends thereof may be connected to the third external electrode.

One ends of the second and fourth connection terminals may be connected to the second external electrode, and the other ends thereof may be connected to the fourth external electrode.

The fifth connection terminal may be connected to the first and third connection terminals.

The sixth connection terminal may be connected to the second and fourth connection terminals.

According to another embodiment of the present disclosure, a board having a multilayer ceramic capacitor mounted thereon, the board may include: a printed circuit board having first and second electrode pads formed thereon; and the multilayer ceramic capacitor as described above, mounted on the printed circuit board.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
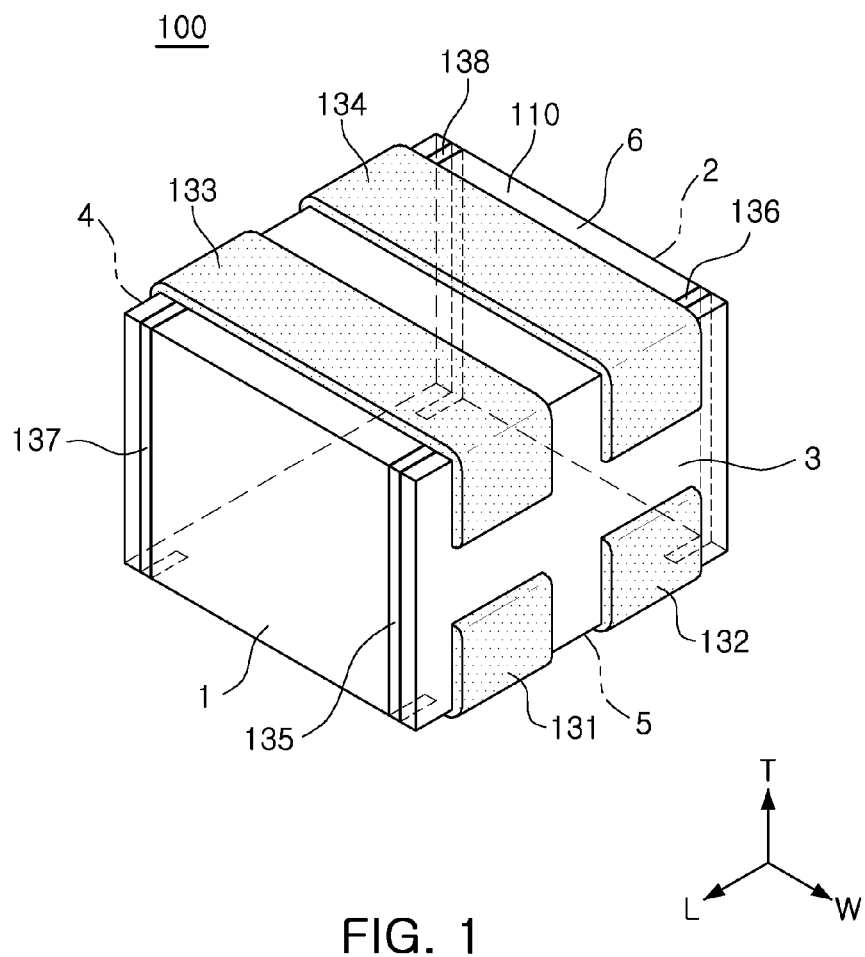
FIG. 1 is a perspective view of a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe the exemplary embodiments of the present disclosure. L, W and T shown in the accompanying drawings refer to a length direction, a width direction, and a thickness direction of the hexahedron, respectively. Here, the thickness direction may be the same as a direction in which dielectric layers are stacked.

Multilayer Ceramic Capacitor

FIG. 1 is a perspective view of a multilayer ceramic capacitor according to an exemplary embodiment of the present disclosure.

Figure 2:
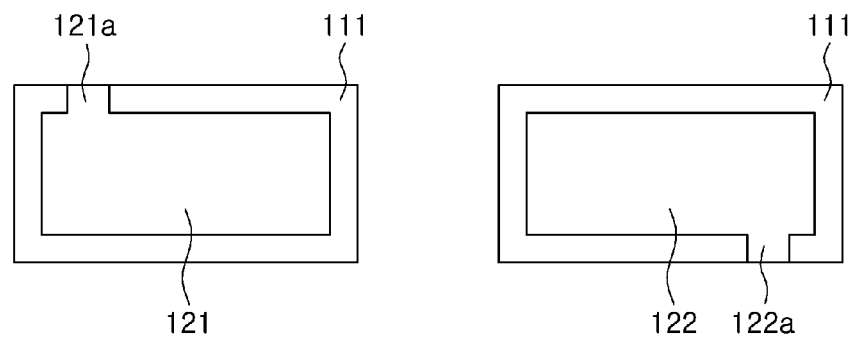
FIG. 2 is a plan view showing first and second internal electrodes applicable to the multilayer ceramic capacitor shown in FIG. 1.

FIG. 2 is a plan view showing first and second internal electrodes applicable to the multilayer ceramic capacitor shown in FIG. 1.

Figure 3:
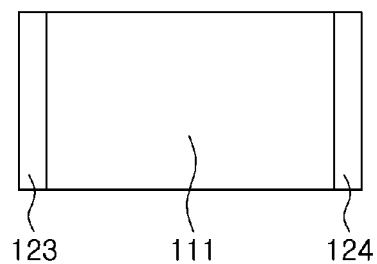
FIG. 3 is a plan view showing first and second internal connection conductors usable together with the first and second internal electrodes shown in FIG. 2.

FIG. 3 is a plan view showing first and second internal connection conductors usable together with the first and second internal electrodes shown in FIG. 2.

Referring to FIGS. 1 through 3, a multilayer ceramic capacitor 100 according to an exemplary embodiment of the present disclosure may include a ceramic body 110 including a plurality of dielectric layers 111 and having first and second main surfaces opposing each other, first and second side surfaces opposing each other, and first and second end surfaces opposing each other.

In this exemplary embodiment, the ceramic body 110 may have first and second main surfaces 5 and 6 opposing each other in a vertical direction, and first and second side surfaces 3 and 4 and first and second end surfaces 1 and 2 that connect the first and second main surfaces to each other.

A shape of the ceramic body 110 is not particularly limited, but may be a hexahedral shape as shown in FIGS. 1 through 3.

The ceramic body 110 may be formed by stacking the plurality of dielectric layers, and a plurality of internal electrodes 121 and 122 (first and second internal electrodes sequentially disposed) may be disposed in the ceramic body 110 to be separated from each other, having the dielectric layers interposed therebetween.

The plurality of dielectric layers 111 configuring the ceramic body 110 may be in a sintered state and be integrated so as not to confirm a boundary between the dielectric layers adjacent to each other.

The dielectric layers 111 may be formed by sintering ceramic green sheets containing a ceramic powder, an organic solvent, and an organic binder. The ceramic powder, a high k material, may be a barium titanate ($BaTiO_3$) based material, a strontium titanate ($SrTiO_3$) based material, or the like. However, the ceramic powder is not limited thereto.

The multilayer ceramic capacitor 100 may include a capacitor part formed in the ceramic body 110 and including the first internal electrode 121 having a first lead 121a exposed to the second side surface 6 and the second internal electrode 122 having a second lead 122a exposed to the first side surface 5.

According to the exemplary embodiment of the present disclosure, the first and second internal electrodes 121 and 122 may be formed using a conductive paste containing a conductive metal.

The conductive metal may be nickel (Ni), copper (Cu), palladium (Pd), or an alloy thereof, but is not limited thereto.

Internal electrode layers may be printed on the ceramic green sheets configuring the dielectric layers using the conductive paste by a printing method such as a screen printing method or a gravure printing method.

The ceramic green sheets having the internal electrodes printed thereon may be alternately stacked and sintered, thereby forming the ceramic body.

In addition, the multilayer ceramic capacitor 100 may include resistor parts including first internal connection conductors 123 exposed to the first and second main surfaces 5 and 6 and the first end surface 1 and second internal connection conductors 124 exposed to the first and second main surfaces 5 and 6 and the second end surface 2, the first and second internal connection conductors 123 and 124 being formed on the same dielectric layers among the plurality of dielectric layers 111 in the ceramic body 110.

The first internal connection conductors 123 may form a first resistor part, and the second internal connection conductors 123 may form a second resistor part, such that they may function as ESR in the multilayer ceramic capacitor.

The first and second internal connection conductors 123 and 124 are not particularly limited but may be formed using, for example, a conductive paste containing a conductive metal, similarly to the first and second internal electrodes 121 and 122.

The conductive metal may be nickel (Ni), copper (Cu), palladium (Pd), or an alloy thereof, but is not limited thereto.

In addition, the multilayer ceramic capacitor 100 may include first to fourth external electrodes 131 to 134 formed on the first and second main surfaces 5 and 6 of the ceramic body and electrically connected to the first and second internal electrodes 121 and 122 and the first and second internal connection conductors 123 and 124.

The first and second external electrodes 131 and 132 may be disposed on the first main surface 5 of the ceramic body 110 to be spaced apart from each other, and the third and fourth external electrodes 133 and 134 may be disposed on the second main surface 6 of the ceramic body 110 to be spaced apart from each other.

According to the exemplary embodiment of the present disclosure, a mounting surface of the multilayer ceramic capacitor 100 may be the first or second main surface 5 or 6 of the ceramic body 110.

That is, the multilayer ceramic capacitor according to the exemplary embodiment of the present disclosure may be a vertical mounting type but is not limited thereto. The multilayer ceramic capacitor may be mounted in various manners.

Therefore, the first and second external electrodes 131 and 132 may contact first and second electrode pads on a board having the multilayer ceramic capacitor mounted thereon to be described below.

According to the exemplary embodiment of the present disclosure, it may be understood that two external electrodes 133 and 134 except for the first and second external electrodes 131 and 132 used as external terminals for connection with a power line are used as external electrodes for controlling ESR.

However, since the first and second external electrodes used as the external terminals may be optionally selected to be appropriate for desired ESR characteristics, the first and second external electrodes are not particularly limited.

The third and fourth external electrodes 133 and 134 capable of being used as the external electrodes for controlling ESR may be in a state of non-contact with the power line as described above (non-contact terminals) and may be positioned on an upper surface of the multilayer ceramic capacitor when the multilayer ceramic capacitor is mounted on a board.

That is, according to the exemplary embodiment of the present disclosure, since the third and fourth external electrodes 133 and 134, the non-contact terminals, are formed on the upper surface rather than the side surface of the multilayer ceramic capacitor, downsizing of the capacitor may not be hindered by the non-contact terminals, which may be advantageous for miniaturization of a product.

The first to fourth external electrodes 131 to 134 may be formed using a conductive paste containing a conductive metal.

The conductive metal may be nickel (Ni), copper (Cu), tin (Sn), or an alloy thereof, but is not limited thereto.

The conductive paste may further contain an insulating material. The insulating material may be, for example, glass, but is not limited thereto.

A method of forming the first to fourth external electrodes 131 to 134 is not particularly limited. That is, the first to fourth external electrodes 131 to 134 may be formed on the ceramic body by a printing method, a dipping method, or another method such as a plating method, or the like.

Subsequently, a plating layer may be further formed on the first to fourth external electrodes 131 to 134.

The multilayer ceramic capacitor 100 is a four-terminal capacitor having a total of four external electrodes, but the present disclosure is not limited thereto.

In addition, the multilayer ceramic capacitor 100 may include first and third connection terminals 135 and 137 formed on the first end surface 1 of the ceramic body 110 and connected to the first internal connection conductors 123, and second and fourth connection terminals 136 and 138 formed on the second end surface 2 of the ceramic body 110 and connected to the second internal connection conductors 124.

The first to fourth connection terminals 135 to 138 may be formed of a conductive metal.

The conductive metal may be nickel (Ni), copper (Cu), tin (Sn), or an alloy thereof, but is not limited thereto.

That is, the first to fourth connection terminals 135 to 138 may be formed by a plating method, unlike in the case of the first to fourth external electrodes 131 to 134, such that the first to fourth connection terminals 135 to 138 may not contain glass unlike the first to fourth external electrodes 131 to 134.

Hereinafter, among components of the multilayer ceramic capacitor 100 according to the exemplary embodiment of the present disclosure, the first and second internal electrodes 121 and 122, the first and second internal connection conductors 123 and 124, and the first to fourth external electrodes 131 to 134 will be described in detail with reference to FIGS. 1 through 3.

The capacitor part may be formed in the ceramic body 110 and include the first internal electrode 121 having the first lead 121a exposed to the second main surface 6 and the second internal electrode 122 having the second lead 122a exposed to the first main surface 5 to thereby form capacitance.

The first lead 121a of the first internal electrode 121 may be connected to the third external electrode 133, and the second lead 122a of the second internal electrode 122 may be connected to the second external electrode 132, but the present disclosure is not limited thereto.

The capacitor part may be disposed in the ceramic body 110 without particular limitations, and in order to implement a target capacitance value, a plurality of capacitor parts may be stacked.

One ends of the first internal connection conductors 123 may be connected to the first internal electrode 121 through the third external electrode 133, and the other ends thereof may be connected to the first external electrode 131.

In addition, the first internal connection conductors 123 may be exposed to the first end surface 1 of the ceramic body 110, and the first and third connection terminals 135 and 137 may be formed on exposed portions of the first internal connection conductors 123 by plating.

According to the exemplary embodiment of the present disclosure, one ends of the second internal connection conductors 124 may be connected to the second internal electrode 122 through the second external electrode 132, and the other ends thereof may be connected to the fourth external electrode 134.

In addition, the second internal connection conductors 124 may be exposed to the second end surface 2 of the ceramic body 110, and the second and fourth connection terminals 136 and 138 may be formed on exposed portions of the second internal connection conductors 124 by plating.

According to the exemplary embodiment of the present disclosure, one ends of the first and third connection terminals 135 and 137 may be connected to the first external electrode 131, and the other ends thereof may be connected to the third external electrode 133.

According to the exemplary embodiment of the present disclosure, one ends of the second and fourth connection terminals 136 and 138 may be connected to the second external electrode 132, and the other ends thereof may be connected to the fourth external electrode 134.

The first and second internal electrodes 121 and 122 may be alternately disposed together with the first and second internal connection conductors 123 and 124, having the dielectric layers 111 therebetween.

A single first internal electrode 121 and a single second internal electrode 122 are shown in FIG. 2, respectively, but actually, a plurality of first internal electrodes 121 and a plurality of second internal electrodes 122 may be provided.

Similarly, a single first internal connection conductor 123 and a single second internal connection conductor 124 are shown in FIG. 3, respectively, but a plurality of first internal connection conductors 123 and a plurality of second internal connection conductors 124 may be provided.

Meanwhile, the internal electrodes and the internal connection conductors may be stacked in a sequence shown in FIGS. 2 and 3 but may be stacked in various sequences, as needed.

That is, the first and second internal connection conductors 123 and 124 may be formed at both end portions of the ceramic body 110 in the width direction, and the plurality of the first and second internal electrodes 121 and 122 may be stacked within a region formed by the first and second internal connection conductors 123 and 124.

Desired ESR characteristics may be further precisely controlled by changing a width, a length, and the number of layers of the first and second internal connection conductors 123 and 124.

A pattern shape of the first and second internal connection conductors 123 and 124 shown in FIG. 3 is provided byway of examples according to an exemplary embodiment of the present disclosure, and the pattern shape of the first and second internal connection conductors 123 and 124 may be variously formed in order to control the ESR.

For example, the first and second internal connection conductors 123 and 124 may have the same pattern shape as that of the first and second internal electrodes 121 and 122 as shown in FIG. 2.

According to the exemplary embodiment of the present disclosure, the resistor parts may be formed by the first and second internal connection conductors 123 and 124, and the ESR of the multilayer ceramic capacitor may be controlled by the resistor parts.

That is, as described below, the capacitor part including the first and second internal electrodes 121 and 122 and the resistor parts including the first and second internal connection conductors 123 and 124 may be connected in series to one another.

The equivalent series resistance (ESR) of the multilayer ceramic capacitor may be controlled by the connection as described above.

Further, in the exemplary embodiment, the first and second external electrodes 131 and 132 may be used as the external terminals for connection with a power line, and the second external electrode 132 may be connected to a ground.

Meanwhile, the third and fourth external electrodes 133 and 134, two external electrodes except for the first and second external electrodes 131 and 132, may be used as the external electrodes for controlling the ESR and be understood as the non-contact terminals.

Figure 4:
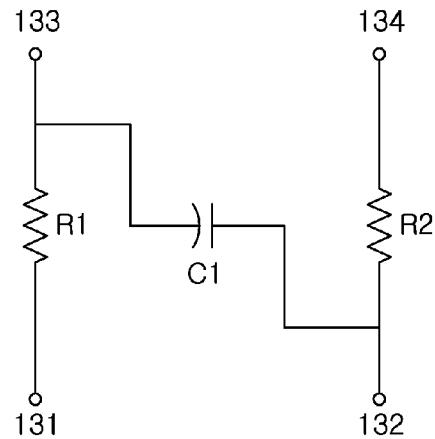
FIG. 4 is an equivalent circuit diagram of the multilayer ceramic capacitor shown in FIG. 1.

FIG. 4 is an equivalent circuit diagram of the multilayer ceramic capacitor shown in FIG. 1.

Referring to FIG. 4, a capacitor part C1 including the first and second internal electrodes 121 and 122 and resistor parts R1 and R2 including the first and second internal connection conductors 123 and 124 may be connected in series to one another.

As described above, the multilayer ceramic capacitor according to the exemplary embodiment of the present disclosure may have two kinds of resistors and one kind of capacitor and control respective values thereof.

The multilayer ceramic capacitor according to the exemplary embodiment of the present disclosure has a structure including the internal electrodes 121 and 122, the internal connection conductors 123 and 124, and the external electrodes 131 to 134 as described above, such that a decrease in impedance and a control thereof may be facilitated in a widened frequency range, and a mounting space and a manufacturing cost may be decreased due to a decrease in the number of components, as compared to an existing structure.

In addition, since the multilayer ceramic capacitor is a vertical mounting type, the downsizing thereof may not be hindered by the non-contact terminals, which may be advantageous for miniaturization of a product.

Figure 5:
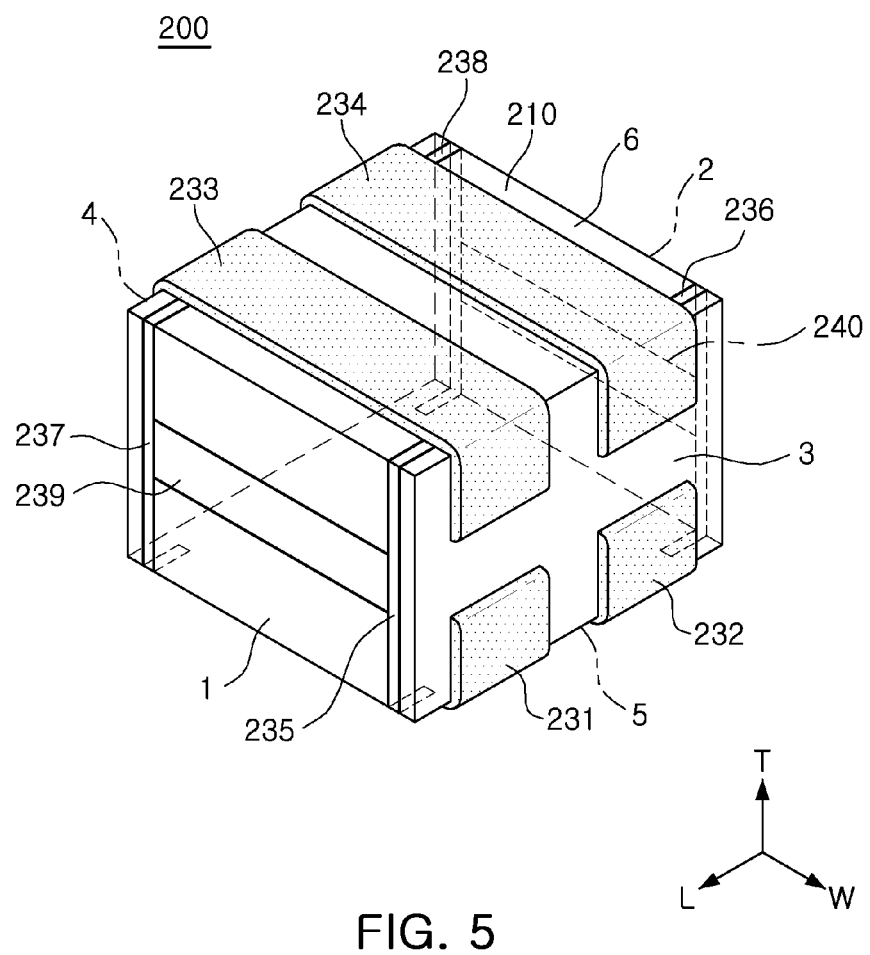
FIG. 5 is a perspective view of a multilayer ceramic capacitor according to another exemplary embodiment of the present disclosure.

FIG. 5 is a perspective view of a multilayer ceramic capacitor according to another exemplary embodiment of the present disclosure.

Figure 6:
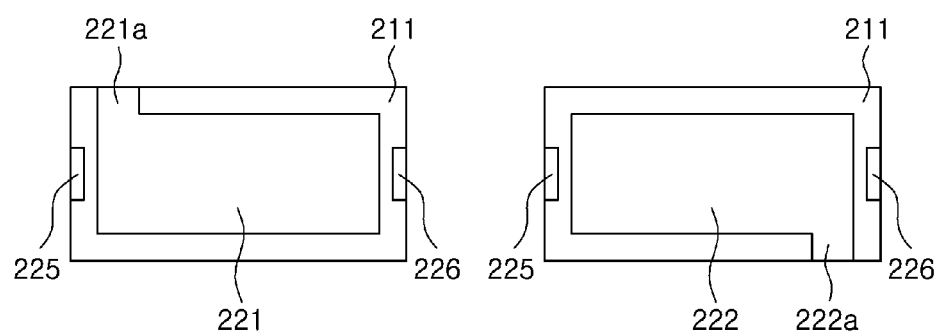
FIG. 6 is a plan view showing first and second internal electrodes applicable to the multilayer ceramic capacitor shown in FIG. 5.

FIG. 6 is a plan view showing first and second internal electrodes applicable to the multilayer ceramic capacitor shown in FIG. 5.

Figure 7:
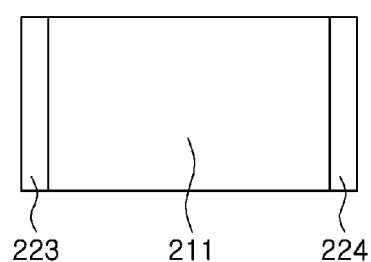
FIG. 7 is a plan view showing first and second internal connection conductors usable together with the first and second internal electrodes shown in FIG. 6.

FIG. 7 is a plan view showing first and second internal connection conductors usable together with the first and second internal electrodes shown in FIG. 6.

Referring to FIGS. 5 through 7, a multilayer ceramic capacitor 200 according to another exemplary embodiment of the present disclosure may include: a ceramic body 210 including a plurality of dielectric layers 211 and having first and second main surfaces opposing each other, first and second side surfaces opposing each other, and first and second end surfaces opposing each other; a capacitor part formed in the ceramic body 210 and including first and second internal electrodes 221 and 222, the first internal electrode 221 having a third lead 221a exposed to the second main surface and the second internal electrode 222 having a fourth lead 222a exposed to the first main surface; resistor parts including first internal connection conductors 223 exposed to the first and second main surfaces and the first end surface and second internal connection conductors 224 exposed to the first and second main surfaces and the second end surface, the first and second internal connection conductors being formed on the same dielectric layers 211 among the plurality of dielectric layers 211 in the ceramic body 210; first and second dummy electrodes 225 and 226 formed in the ceramic body 210, the first dummy electrode 225 being exposed to the first end surface of the ceramic body 210 and the second dummy electrode 226 being exposed to the second end surface of the ceramic body 210; and first to fourth external electrodes 231 to 234 formed on the first and second main surfaces of the ceramic body 210 and electrically connected to the first and second internal electrodes 221 and 222 and the first and second internal connection conductors 223 and 224, first and third connection terminals 235 and 237 formed on the first end surface of the ceramic body 210 and connected to the first internal connection conductors 223, second and fourth connection terminals 236 and 238 formed on the second end surface of the ceramic body 210 and connected to the second internal connection conductors 224, a fifth connection terminal 239 formed on the first end surface of the ceramic body 210 and connected to the first dummy electrode 225, and a sixth connection terminal 240 formed on the second end surface of the ceramic body 210 and connected to the second dummy electrode 226, wherein the capacitor part and the resistor parts may be connected in series to one another.

In another exemplary embodiment of the present disclosure, the third lead 221a of the first internal electrode 221 may be connected to the third external electrode 233, and the fourth lead 222a of the second internal electrode 222 may be connected to the second external electrode 232.

One ends of the first internal connection conductors 223 may be connected to the first internal electrode 221 through the third external electrode 233, and the other ends thereof may be connected to the first external electrode 231.

In addition, the first internal connection conductors 223 may be exposed to the first end surface 1 of the ceramic body 210, and the first and third connection terminals 235 and 237 may be formed on exposed portions of the first internal connection conductors 223 by plating.

In another exemplary embodiment of the present disclosure, one ends of the second internal connection conductors 224 may be connected to the second internal electrode 222 through the second external electrode 232, and the other ends thereof may be connected to the fourth external electrode 234.

In addition, the second internal connection conductors 224 may be exposed to the second end surface 2 of the ceramic body 210, and the second and fourth connection terminals 236 and 238 may be formed on exposed portions of the second internal connection conductors 224 by plating.

In another exemplary embodiment of the present disclosure, one ends of the first and third connection terminals 235 and 237 may be connected to the first external electrode, and the other ends thereof may be connected to the third external electrode 233.

In another exemplary embodiment of the present disclosure, one ends of the second and fourth connection terminals 236 and 238 may be connected to the second external electrode 232, and the other ends thereof may be connected to the fourth external electrode 234.

Meanwhile, the multilayer ceramic capacitor 200 may include the first dummy electrode 225 formed in the ceramic body 210 and exposed to the first end surface 1 of the ceramic body 210 and the second dummy electrode 226 formed in the ceramic body 210 and exposed to the second end surface 2 of the ceramic body 210.

The first and second dummy electrodes 225 and 226 are not particularly limited but may be formed using, for example, a conductive paste including a conductive metal, similarly to the first and second internal electrodes 221 and 222.

The conductive metal may be nickel (Ni), copper (Cu), palladium (Pd), or an alloy thereof, but is not limited thereto.

The first dummy electrode 225 may be connected to the fifth connection terminal 239 formed on the first end surface 1 of the ceramic body 210, and the second dummy electrode 226 may be connected to the sixth connection terminal 240 formed on the second end surface 2 of the ceramic body 210.

In another exemplary embodiment, the fifth connection terminal 239 may be connected to the first and third connection terminals 235 and 237, but is not necessarily limited thereto.

In another exemplary embodiment, the sixth connection terminal 240 may be connected to the second and fourth connection terminals 236 and 238, but is not necessarily limited thereto.

Since other features of the multilayer ceramic capacitor according to another exemplary embodiment of the present disclosure are the same as those of the multilayer ceramic capacitor according to the foregoing exemplary embodiment of the present disclosure, a detailed description thereof will be omitted.

Board Having Multilayer Ceramic Capacitor Mounted Thereon

Figure 8:
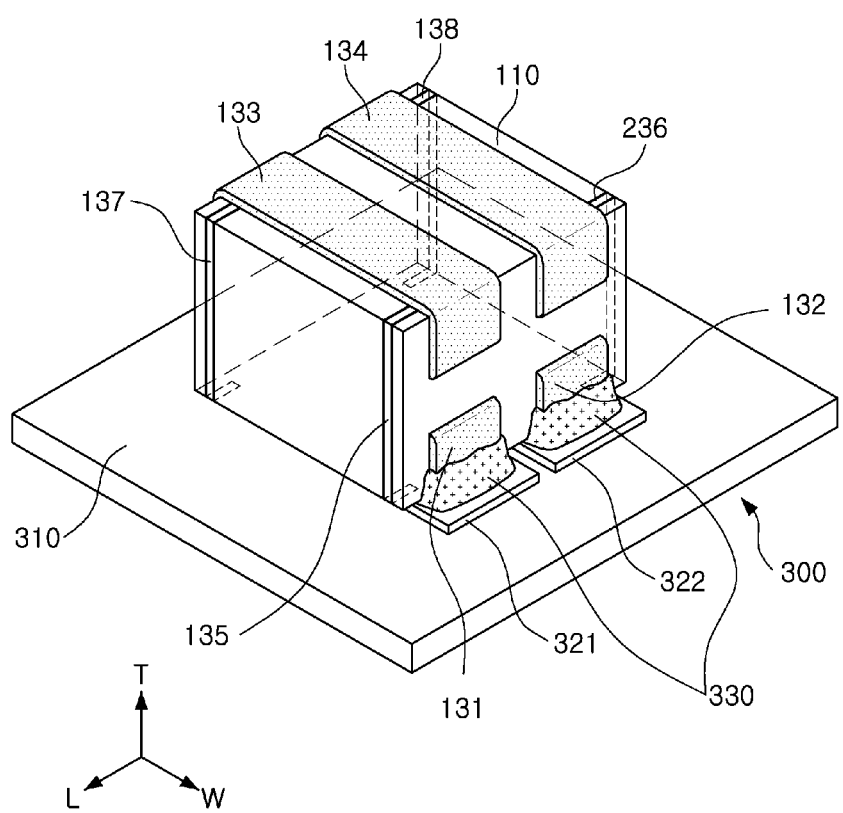
FIG. 8 is a perspective view showing a state in which the multilayer ceramic capacitor of FIG. 1 is mounted on a printed circuit board.

FIG. 8 is a perspective view showing a state in which the multilayer ceramic capacitor of FIG. 1 is mounted on a printed circuit board.

Referring to FIG. 8, a board 300 having the multilayer ceramic capacitor 100 mounted thereon according to an exemplary embodiment of the present disclosure may include a printed circuit board 310 on which the internal electrodes of the multilayer ceramic capacitor 100 are mounted to be perpendicular thereto and first and second electrode pads 321 and 322 formed on an upper surface of the printed circuit board 310 to be spaced apart from each other.

In this case, the multilayer ceramic capacitor 100 may be electrically connected to the printed circuit board 310 by soldering parts 330 while the first and second external electrodes 131 and 132 are positioned on the first and second electrode pads 321 and 322 to be in contact therewith.

Except for the description described above, a description of features overlapped with those of the multilayer ceramic capacitor according to the foregoing exemplary embodiment of the present disclosure will be omitted.

Figure 9:
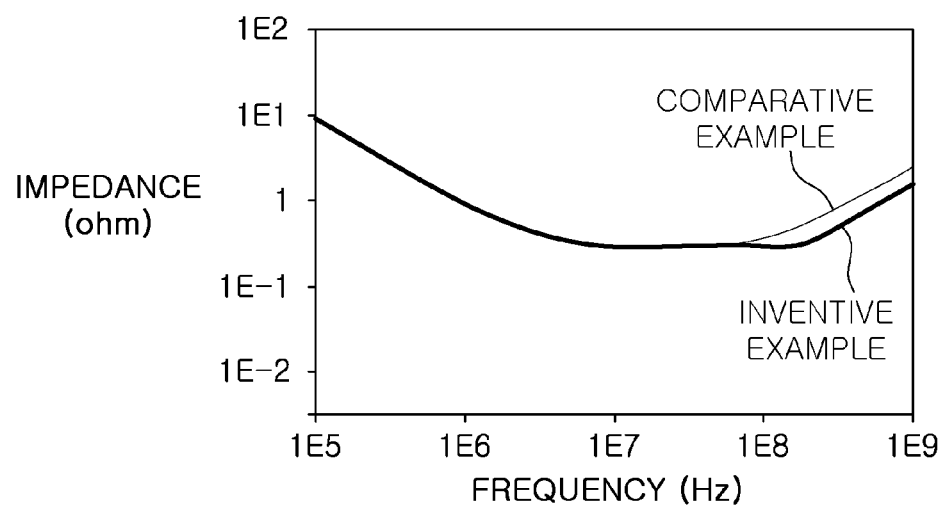
FIG. 9 is a graph illustrating comparison results of impedance of Inventive Example and Comparative Example.

FIG. 9 is a graph illustrating comparison results of impedance of Inventive Example and Comparative Example.

Referring to FIG. 9, it may be appreciated that in the multilayer ceramic capacitor according to the exemplary embodiment of the present disclosure, impedance may be flat in a widened frequency region and the impedance may be decreased, as compared with Comparative Example, which is a multilayer ceramic capacitor according to the related art.

As set forth above, according to exemplary embodiments of the present disclosure, the multilayer ceramic capacitor may include the capacitor part and the resistor part and control the value of each of the capacitor part and the resistor part.

Therefore, as compared to the structure according to the related art, it may be easy to decrease and control the impedance in the wider frequency region, and as the number of components is decreased, the mounting space and cost may be decreased.

In addition, as the capacitor is vertically mounted, the downsizing may not be hindered by the No contact terminal, which may be advantageous for miniaturization of the product.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
a ceramic body including a plurality of dielectric layers and having first and second main surfaces opposing each other, first and second side surfaces opposing each other, and first and second end surfaces opposing each other;
a capacitor part disposed in the ceramic body and including first and second internal electrodes, the first internal electrode having a first lead exposed to the second main surface and the second internal electrode having a second lead exposed to the first main surface;
resistor parts including first internal connection conductors exposed to the first and second main surfaces and the first end surface and second internal connection conductors exposed to the first and second main surfaces and the second end surface, the first and second internal connection conductors being disposed on the same dielectric layers among the plurality of dielectric layers in the ceramic body; and
first to fourth external electrodes disposed on the first and second main surfaces of the ceramic body and electrically connected to the first and second internal electrodes and the first and second internal connection conductors, first and third connection terminals disposed on the first end surface of the ceramic body and connected to the first internal connection conductors, and second and fourth connection terminals disposed on the second end surface of the ceramic body and connected to the second internal connection conductors,
wherein the capacitor part and the resistor parts are connected in series to one another.

2. The multilayer ceramic capacitor of claim 1, wherein the first lead of the first internal electrode is connected to the third external electrode and the second lead of the second internal electrode is connected to the second external electrode.

3. The multilayer ceramic capacitor of claim 1, wherein one ends of the first internal connection conductors are connected to the first internal electrode through the third external electrode, and the other ends thereof are connected to the first external electrode.

4. The multilayer ceramic capacitor of claim 1, wherein one ends of the second internal connection conductors are connected to the second internal electrode through the second external electrode, and the other ends thereof are connected to the fourth external electrode.

5. The multilayer ceramic capacitor of claim 1, wherein one ends of the first and third connection terminals are connected to the first external electrode, and the other ends thereof are connected to the third external electrode.

6. The multilayer ceramic capacitor of claim 1, wherein one ends of the second and fourth connection terminals are connected to the second external electrode, and the other ends thereof are connected to the fourth external electrode.

7. A multilayer ceramic capacitor comprising:
a ceramic body including a plurality of dielectric layers and having first and second main surfaces opposing each other, first and second side surfaces opposing each other, and first and second end surfaces opposing each other;
a capacitor part disposed in the ceramic body and including first and second internal electrodes, the first internal electrode having a third lead exposed to the second main surface and the second internal electrode having a fourth lead exposed to the first main surface;
resistor parts including first internal connection conductors exposed to the first and second main surfaces and the first end surface and second internal connection conductors exposed to the first and second main surfaces and the second end surface, the first and second internal connection conductors being disposed on the same dielectric layers among the plurality of dielectric layers in the ceramic body;
first and second dummy electrodes disposed in the ceramic body, the first dummy electrode being exposed to the first end surface of the ceramic body and the second dummy electrode being exposed to the second end surface of the ceramic body; and
first to fourth external electrodes disposed on the first and second main surfaces of the ceramic body and electrically connected to the first and second internal electrodes and the first and second internal connection conductors, first and third connection terminals disposed on the first end surface of the ceramic body and connected to the first internal connection conductors, second and fourth connection terminals disposed on the second end surface of the ceramic body and connected to the second internal connection conductors, and a fifth connection terminal disposed on the first end surface of the ceramic body and connected to the first dummy electrode and a sixth connection terminal disposed on the second end surface of the ceramic body and connected to the second dummy electrode, wherein the capacitor part and the resistor parts are connected in series to one another.

8. The multilayer ceramic capacitor of claim 7, wherein the third lead of the first internal electrode is connected to the third external electrode and the fourth lead of the second internal electrode is connected to the second external electrode.

9. The multilayer ceramic capacitor of claim 7, wherein one ends of the first internal connection conductors are connected to the first internal electrode through the third external electrode, and the other ends thereof are connected to the first external electrode.

10. The multilayer ceramic capacitor of claim 7, wherein one ends of the second internal connection conductors are connected to the second internal electrode through the second external electrode, and the other ends thereof are connected to the fourth external electrode.

11. The multilayer ceramic capacitor of claim 7, wherein one ends of the first and third connection terminals are connected to the first external electrode, and the other ends thereof are connected to the third external electrode.

12. The multilayer ceramic capacitor of claim 7, wherein one ends of the second and fourth connection terminals are connected to the second external electrode, and the other ends thereof are connected to the fourth external electrode.

13. The multilayer ceramic capacitor of claim 7, wherein the fifth connection terminal is connected to the first and third connection terminals.

14. The multilayer ceramic capacitor of claim 7, wherein the sixth connection terminal is connected to the second and fourth connection terminals.

15. A board having a multilayer ceramic capacitor mounted thereon, the board comprising:
a printed circuit board having first and second electrode pads disposed thereon; and
the multilayer ceramic capacitor of claim 1 mounted on the printed circuit board.

16. A board having a multilayer ceramic capacitor mounted thereon, the board comprising:
a printed circuit board having first and second electrode pads disposed thereon; and
the multilayer ceramic capacitor of claim 7 mounted on the printed circuit board.

* * * * *